219-121

SEARCH ROOM

Nov. 4, 1969 J. W. ROVAN 3,476,906

RESISTANCE MONITORING APPARATUS

Filed Nov. 21, 1966 3 Sheets-Sheet 1

INVENTOR
JOSEPH W. ROVAN
BY Fishman + Van Kirk
ATTORNEYS

RESISTANCE MONITORING APPARATUS

Filed Nov. 21, 1966 3 Sheets-Sheet 2

RESISTANCE MONITORING APPARATUS

Filed Nov. 21, 1966 3 Sheets-Sheet 3

United States Patent Office 3,476,906

Patented Nov. 4, 1969

3,476,906

RESISTANCE MONITORING APPARATUS

Joseph W. Rovan, Broad Brook, Conn., assignor to United Aircraft Corporation, East Hartford, Conn., a corporation of Delaware Filed Nov. 21, 1966, Ser. No. 595,974
Int. Cl. B23k *9/00;* H01c *17/00*
U.S. Cl. 219—121 7 Claims

ABSTRACT OF THE DISCLOSURE

Apparatus for monitoring the value of a thin film resistor, which is being trimmed to value in step-wise fashion by an electron beam subtractive process, wherein the resistor being trimmed is connected in a bridge circuit and the measuring point of the bridge circuit is periodically grounded in order to rapidly dissipate charges built up on the thin film to thereby enable accurate measurement of the value of the component being fabricated and to increase the speed of the trimming operation.

The present invention relates to subtractive processes for the formation of devices. More particularly, the present invention relates to the manufacture of thin film electronic circuit components. Accordingly, the general objects of the present invention are to provide new and improved methods and apparatus of such character.

While not limited thereto in its utility, the present invention is particularly well suited for use with apparatus which completes the fabrication of thin film electronic circuit components by means of a high energy beam. For example, the forming of thin film resistors, capacitors and inductors by an electron beam subtractive process is well known in the art. For further details of such electron beam processes, reference may be had to U.S. Patent No. 3,140,379 issued July 7, 1964, to F. Schleich et al. and assigned to the same assignee as the present invention.

The manufacture of thin film components in accordance with the teachings of the above-mentioned Schleich et al. patent has enabled such components to be produced with a high degree of accuracy. That is, employing electron beam techniques, components such as thin film resistors may easily be scribed to within one percent of the desired value and, unlike chemical etching techniques, the component values achieved are highly repeatable. In addition, electron beam scribing techniques permit a plurality of resistors of different size to be easily formed upon the same substrate. Further, since the electron beam scribed thin film component is produced from an area film, the problems usually associated with masking during deposition of the film are minimized.

However, for all their advantages, electron and ion beam scribing of devices has been hampered by an inability to remove material at a rate commensurate with the capability of the charged particle beam generator. That is, while the working beam may be pulsed and deflected at an extraordinary rapid rate, it has previously not been possible to monitor the value of the component being scribed at a speed commensurate with the cutting rate. It is standard practice to scribe devices by using a pulsed beam. Pulsing the beam minimizes the total energy input into the work and thus minimizes the chance of thermal damage to the substrate or film being scribed. In addition, by pulsing the beam, the component value may be measured between pulses and thus the component may be trimmed in step-wise fashion precisely to the value desired; the cutting operation being terminated upon coincidence of the desired value with a standard. High energy beams; electron, ion or other types; inject energy into the work piece during the cutting or scribing operation. This energy adds an uncontrolled variable that usually manifests itself as an electrical charge build up at the measuring point. In the case of an electron beam resistor scribing operation, the charge build up is usually of such magnitude as to mask the actual resistance change. Thus, before the resistance value was sensed after each cutting pulse, it has previously been necessary to wait a time sufficient for the charge to be dissipated. This dissipation time is determined by the RC time constant of the circuit comprised of the resistor being formed and the interelectrode capacitance. This RC time constant, which will hereinafter be referred to as the normal or actual decay time of the beam injected charge, is a function of the total resistance of the circuit including the resistance being scribed, the input resistance of the measuring apparatus, the resistance of the standard resistor against which the component being formed must be compared and other resistances in the circuit. Obviously, the necessity of waiting for a period of time determined by the RC time constant of the circuit resulted in inefficient operation of the machining apparatus. Restated, the charge build up at the measuring point has made high speed and automatic production methods impossible and has resulted in scribing at a rate far below the capability of the equipment. It should be noted that, while the problem of charge build up on the work is particularly evident in the case of electron and ion beam scribing, it is also a problem in the case of laser beam scribing and grit blasting operations.

The present invention solves the aforementioned problem of comparatively slow machining rates by discharging the measuring point (point at which the value of the component being formed is sensed) to a fixed (ground) reference shortly after each operating interval (pulse) of the high energy beam. This discharge is accomplished by means of an electronic switch which holds the measuring point at ground for a short period sufficient to discharge the built up charge. The closing of the switch short circuits at least a portion of the resistance in the RC circuit which includes the resistor being scribed thereby reducing the discharge time of the circuit. When the electronic switch is turned off, the measuring point quickly reaches steady state value thus allowing a high speed dynamic system in which the value of the component under test (fabrication) may be measured under simulated ideal steady state conditions.

It is therefore an object of the present invention to perform a subtractive process at a faster rate than previously possible.

It is another object of the present invention to perform a high energy beam scribing process at a previously unobtainable rate.

It is also an object of the present invention to proceed in step-wise fashion to scribe thin film electronic circuit components at a speed faster than the natural decay time of the charge injected in the element being scribed by the beam.

It is a further object of the present invention to scribe thin film electronic circuit components with an electron beam at a faster rate than previously possible.

It is yet another object of the present invention to provide a node suppressor for a scribing process control.

It is an additional object of the present invention to increase the speed of a pulsed electron beam scribing operation by discharging the measuring point for the component being scribed after each working pulse.

These and other objects and the various advantages of the present invention will become obvious to those skilled in the art by reference to the accompanying drawing taken in conjunction with the following description thereof. In the drawing, like reference numerals refer to like elements in the various figures and:

Figure 1:
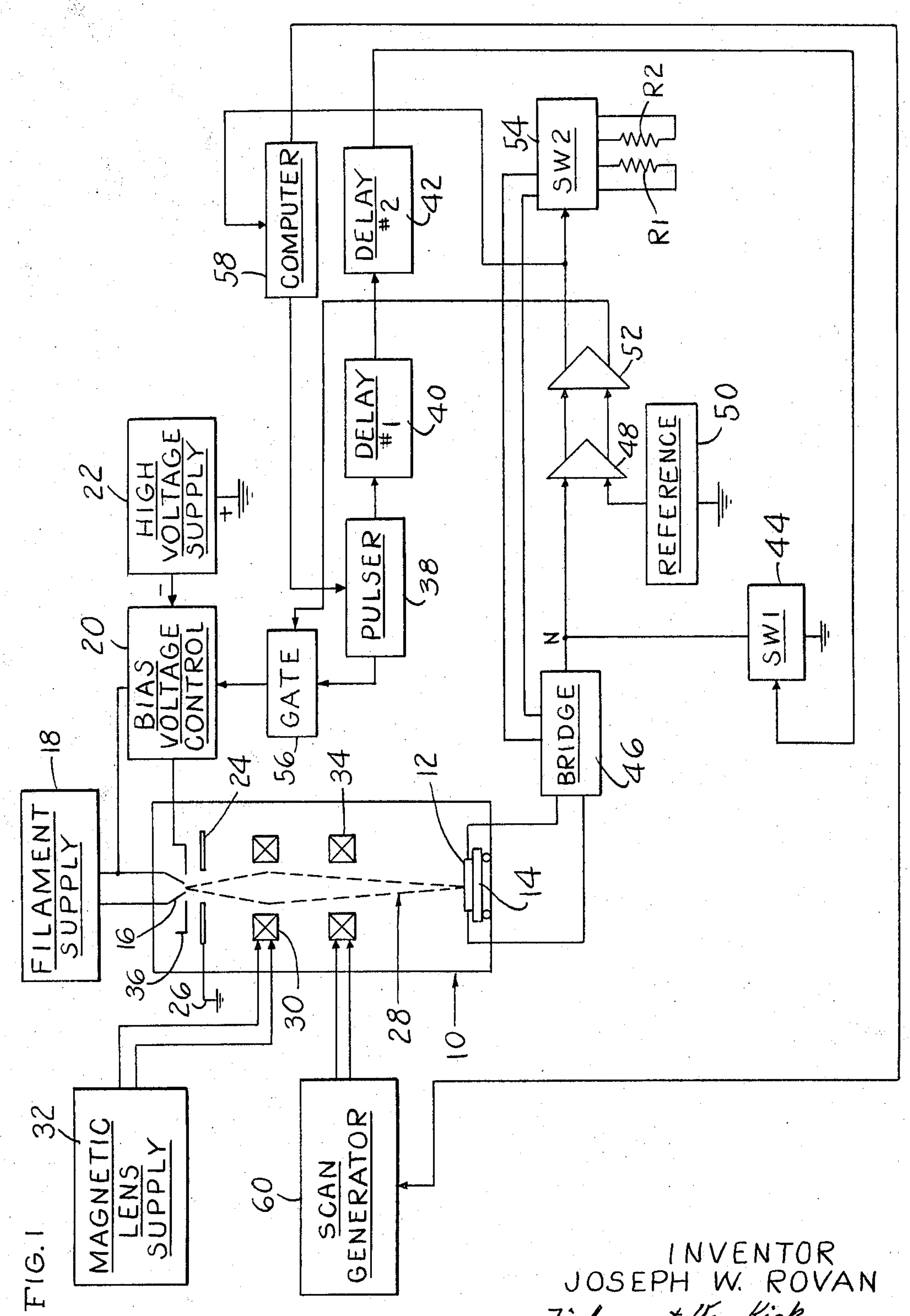
FIGURE 1 is a block diagram of a first embodiment of the present invention in the environment of an electron beam scribing apparatus.

The present invention will be now described in connection with the formation of a thin film resistor by an electron beam subtractive process. However, as previously noted, the present invention is not limited in its utility to the fabrication of thin film circuit components or to electron beam processes. For the fabrication of thin film resistors, chromium or materials such as Nichrome or mixtures of chromium or Nichrome or oxides of various materials may be employed. As is well known in the art, the above mentioned resistive materials may be deposited on a substrate, usually a terminated microwafer comprised of a ceramic material or glass, by vacuum deposition, sputtering, etc. After the resistive material has been deposited, it is common practice to provide a protective overlay of silicon monoxide or other dielectric material, also by vacuum deposition. Chromium and other material thin film resistors are well known in the art and are stable up to 300 to 400° centigrade with low temperature coefficients. Chromium, for example, can be readily vaporized in a controlled, reproducable fashion with an electron gun heat source and, as will be explained below, is susceptible to electron beam scribing of resistive patterns. After deposition of the resistive film on the terminated wafer, it is usually necessary to isolate the film into a plurality of sections so as to enable a plurality of individual resistors to be formed from the single area of film. Thereafter, the resistors themselves are formed by selectively removing portions of the layers of resistive material and protective overlay. One method of accomplishing the isolation and trimming to value is to carefully etch away portions of the single or multilayered thin film by causing local evaporation thereof with a highly energized beam which may be deflected across the surface of the substrate wafer in accordance with a predetermined pattern. When an electron beam is to be used for this purpose, a device such as that shown in FIGURES 5 and 6 of the aforementioned Schleich et al. patent may be employed. An electron beam is a particularly useful tool for the scribing of thin film devices since the electron beam contains no impurities and has practically no mass but has high kinetic energy because of the extremely high velocity imparted to the electrons. Transfer of this kinetic energy to the lattice electrons of the work piece generates higher lattice vibrations which cause an increase in the temperature within the impingement area sufficient to accomplish work. Electron beams may be focused so as to have diameters of less than 0.0005 inch at the point of impingement on the work. Impingement of such a highly focused, intense electron beam on the surface of a substrate will etch away portions of the conductive and dielectric films by causing local evaporation thereof. Through programming of the beam deflection by means well known in the art, discreet conductive paths separated by areas in which the resistive material has been selectively removed may be produced accurately and automatically. The areas from which the material has been removed thus become insulating regions. For a given film material and thickness, the resistance of the thin film device will be determined by the length of the continuous path between two terminal pads. Thus, the value of the thin film resistor may be precisely controlled by adjusting the length of this path while comparing the value of the resistor being formed with that of a standard resistor.

Referring now to FIGURE 1, an electron beam generator is indicated generally at 10. The beam generator comprises an evacuated envelope in which a suitably fixtured work piece 12 is placed on a movable table or conveyer 14. In the example being described work piece 12 comprises a substrate wafer on which an area film of material having the desired resistivity has been deposited or otherwise formed. Generator 10 also comprises an electron beam forming column containing a source of electrons, beam forming and beam focusing means. The source of electrons comprises a directly heated cathode or filament 16 which is supplied with heating current from a filament current supply 18. Cathode 16 also has applied thereto, through a bias control 20, a negative acceleration voltage from high voltage supply 22. An apertured anode 24 is positioned in the electron beam column between cathode 16 and work piece 12. The anode is grounded at 26. The difference in potential between cathode 16 and anode 24 causes the electrons emitted from the cathode to be accelerated toward the work piece. The electrons are focused into a beam indicated generally as 28 by an electron optical system comprising in part a magnetic lens assembly 30 which is supplied with focusing current from a lens current supply 32.

When gated on in the manner to be described below, beam 28 impinges on work piece 12 where it gives up kinetic energy in the form of heat. Beam 28 may be deflected over the surface of the work piece by means of varying current supplied to deflection coils 34. Positioned adjacent cathode 16 is a control electrode 36. The control electrode is normally maintained at a voltage which is more negative than the voltage applied to the cathode. The magnitude of this bias or voltage difference is such that the machine is normally cut off. When it is desired to impinge the beam on work piece 12, the blocking bias voltage is removed or reduced by applying a control signal to bias voltage control 20. Control 20 may be of the type described in U.S. Patent No. 3,177,434, issued April 6, 1965, to John A. Hansen and assigned to the same assignee as the present invention. The control signal for bias voltage control 20 is generated by a pulser 38 and is applied to the bias voltage control through a normally open gate 56.

The output from pulser 38 is also applied to a delay device 40. After a predetermined period, delay device 40 applies a pulse to a second delay device 42. Delay device 42 generates an output pulse having a predetermined pulse width which is applied to an electronic switch 44. The actual circuitry of delay devices 40 and 42 and switch 44 may be seen from FIGURE 3.

Operation of switch 44 grounds the node or measuring point N of a bridge circuit 46. Point N of bridge circuit 46 is applied to a first differential amplifier 48 wherein it is compared to a reference signal from a source 50. The output of differential amplifier 48 is applied to a second high gain differential amplifier 52. The choice of high gain differential amplifiers for amplifiers 48 and 52 is dictated by the high noise level in the system. That is, the high gain differential amplifiers provide good common mode rejection.

The outputs from differential amplifiers 52 are respectively applied to a second electronic switch 54 and to gate circuit 56. When a signal is measured at node point N indicative of a balanced bridge condition, amplifier 52 will produce an output signal of the proper magnitude and polarity to cause gate 56 to be closed and switch 54 to be actuated. Switch 54, as may be seen from FIGURE 2, connects a desired standard resistance in the leg of bridge 46 opposite to the resistor being scribed. Only two standard resistors, R1 and R2 are shown in FIGURE 1. However, it is to be understood that any number of standard resistors may be employed and the order in which these resistors are placed in the bridge 46 may be controlled by computer 58 which exercises the overall control over the scribing operation. It should further be noted that, in a preferred embodiment, switch 54 comprises a reed relay matrix of a type well known in the art. An output of differential amplifier 52 is also applied as an input to computer 58 and commands the computer to proceed to the next operation in a stored sequence upon the generation of a signal indicative of the termination of an individual scribing operation.

As mentioned above, the order in which the standard resistors are connected into bridge 46 by switch 54 may be controlled by a computer 58. Computer 58 also controls the magnitude and duration of the pulses applied to control electrode 36 and thus controls the machining operation. In addition, in a manner well known in the art, computer 58 exercises control over scanning generator 60 such that the beam is deflected in accordance with the proper stored pattern as it is pulsed. Computer control of high energy beam machining operations is well known in the art and does not comprise part of the present invention.

Figure 2:
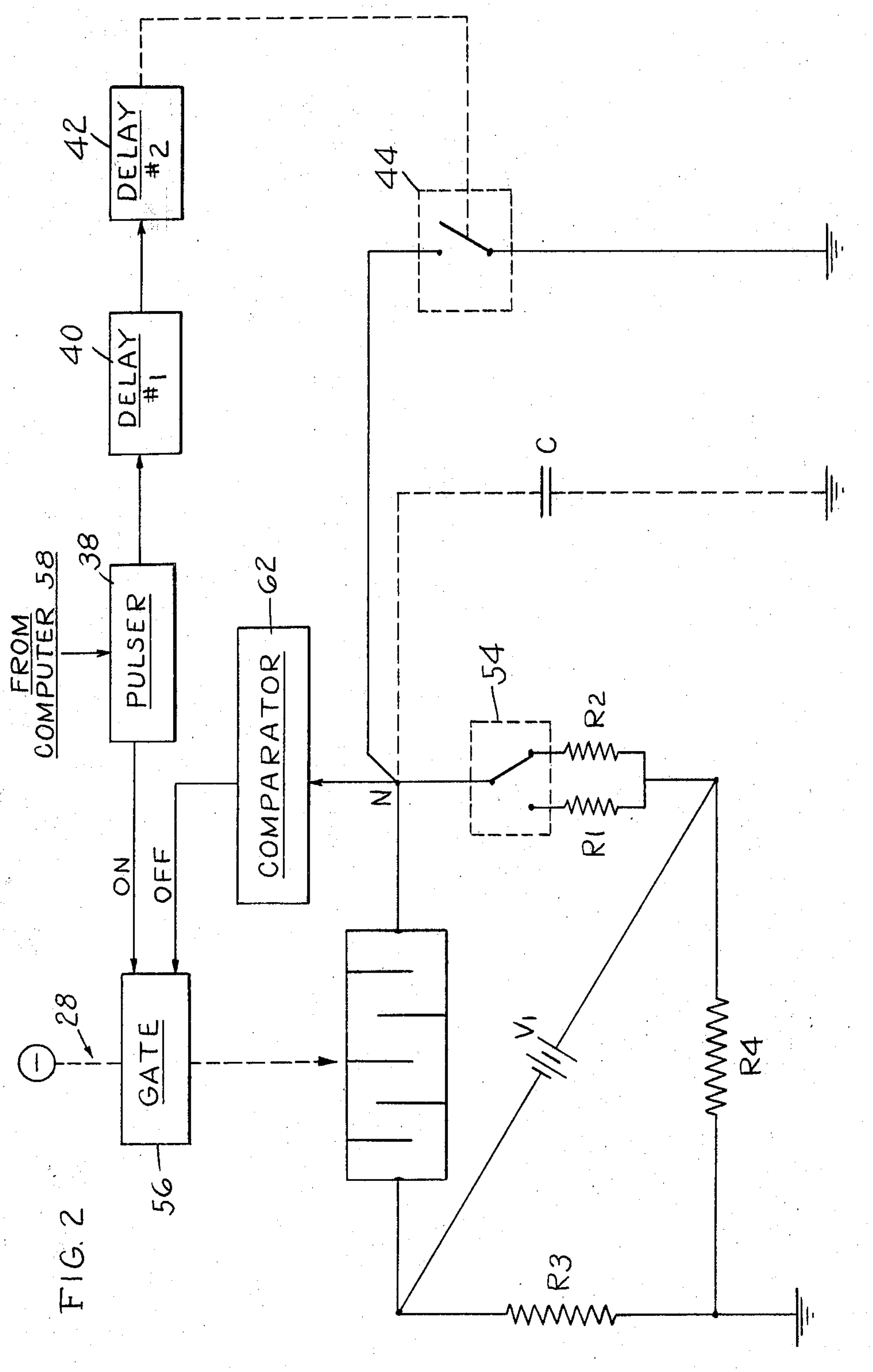
FIGURE 2 is a simplified block diagram of a preferred embodiment of the present invention.

FIGURE 2 comprises a simplified diagram of a preferred embodiment of the present invention. In FIGURE 2, bridge 46 is shown as being comprised of either of standard resistors R1 and R2, a pair of matched resistors R3 and R4 and, in the leg opposite to the standard resistor, the resistor being formed by scribing the resistive film on substrate 12. The bridge is completed by the conventional voltage source VI. Capacitor C represents the interelectrode capacitance which determines the natural discharge time for the charge injected in the thin film resistor by the beam pulses.

The output of the bridge, from node point N, is applied to a comparator 62. Comparator 62 comprises differential amplifiers 48 and 52 of FIGURE 1. The output of comparator 62 is applied to gate 56 to cause blocking of the working beam 28. Gate 56 is shown symbolically in FIGURE 2 as actually being disposed in the path of beam 28. Node point N of the bridge is also connected to the first terminal of switch 44. The second terminal of switch 44 is connected to ground.

Pulser 38 is connected so as to provide pulses to gate 56 to turn on beam 28 and simultaneously to trigger the first delay device 40. As noted above, the output of delay device 40 is applied to delay device 42. The output of delay device 42 causes closing of switch 44 thereby connecting node point N to ground and discharging the measuring point to a fixed reference; in this case ground potential.

In a typical machining operation, computer 58 will cause pulser 38 to generate a pulse having a width of 2 microseconds with a dwell time of 28 microseconds between pulses. However, depending on such factors as the thickness and composition of the film being machined and the substrate, computer 58 may be programmed to provide for the generation of pulses of from 2 to 8 microseconds duration. The time for each cycle will remain at 30 microseconds regardless of pulse width. The output pulse from pulser 38 operates through normally open gate 56 and bias control 20 to pulse on the electron beam. The 2 to 8 microsecond pulse from pulser 38 is also applied to delay device 40. Delay device 40, upon receipt of an input pulse, generates a pulse having a width of 10 microseconds which is applied to delay device 42. The provision for a 10 microsecond pulse from delay device 40 provides flexibility in the choice of the beam pulse width. Upon termination of the 10 microsecond pulse from delay device 40, delay device 42 generates a five microsecond pulse which is applied to switch 44 to cause closing of the switch. Thus, after the beam 28 has ceased to operate on the thin film resistor, switch 44 will be closed for a period of 5 microseconds. The closing of switch 44 for the 5 microsecond period discharges the measuring node N at a rate faster than the actual decay time of the beam injected charge. As previously noted, the actual decay time of the charge is the time it takes for the charge to decay through all of the resistances of the circuit including $R_2$, $R_3$, $R_4$ and $R_{comparator}$. Whether or not the charge which builds up on the resistor being scribed is thought of as charging an equivalent capacitor to ground or as charging an equivalent capacitor in series with $R_{scribed}$, or possibly a combination of both, the discharge time would involve all of the aforementioned resistances. Therefore, the closing of switch 44 shorts out all of the resistances in the equivalent parallel capacitor case and shorts out $R_2$, $R_4$ and $R_{comparator}$ in the equivalent series case. Thus, the discharge time is reduced when switch 44 is closed. At the end of the 5 microsecond pulse from delay device 42, switch 44 will reopen and comparator 62 (differential amplifiers 48 and 52 and reference source 50) will, in effect, sense the value of the resistor being scribed and, if the bridge is unbalanced, will permit the beam to be pulsed again thus removing additional material and lengthening the path between the terminals of the thin film resistor. In this manner, the thin film resistor is adjusted in step-wise fashion to match the standard resistor. When the two resistors match, the bridge will be balanced and no signal will appear at point N. When the bridge is balanced, an output from comparator 62 (amplifier 52) causes gate 56 to turn to the off condition thereby preventing additional scribing. At the same time, switch 52 will, if desired, step to the next standard resistor and computer 58 will be advised that the next operation in the stored sequence should be performed. Computer 58 will then, by means not shown but standard in the art, cause a new discreet area of film of resistive material to be connected in the leg of the bridge formerly occupied by the resistor which has been completed. Connection of the new or untrimmed resistive film into bridge 46 will again unbalance the bridge and cause removal of the disabling (off) signal from gate 56. Under the control of the computer, the beam then begins pulsing while being deflected across the surface of the substrate in accordance with a stored pattern so as to trim the new resistor precisely to the desired value.

Figure 3:
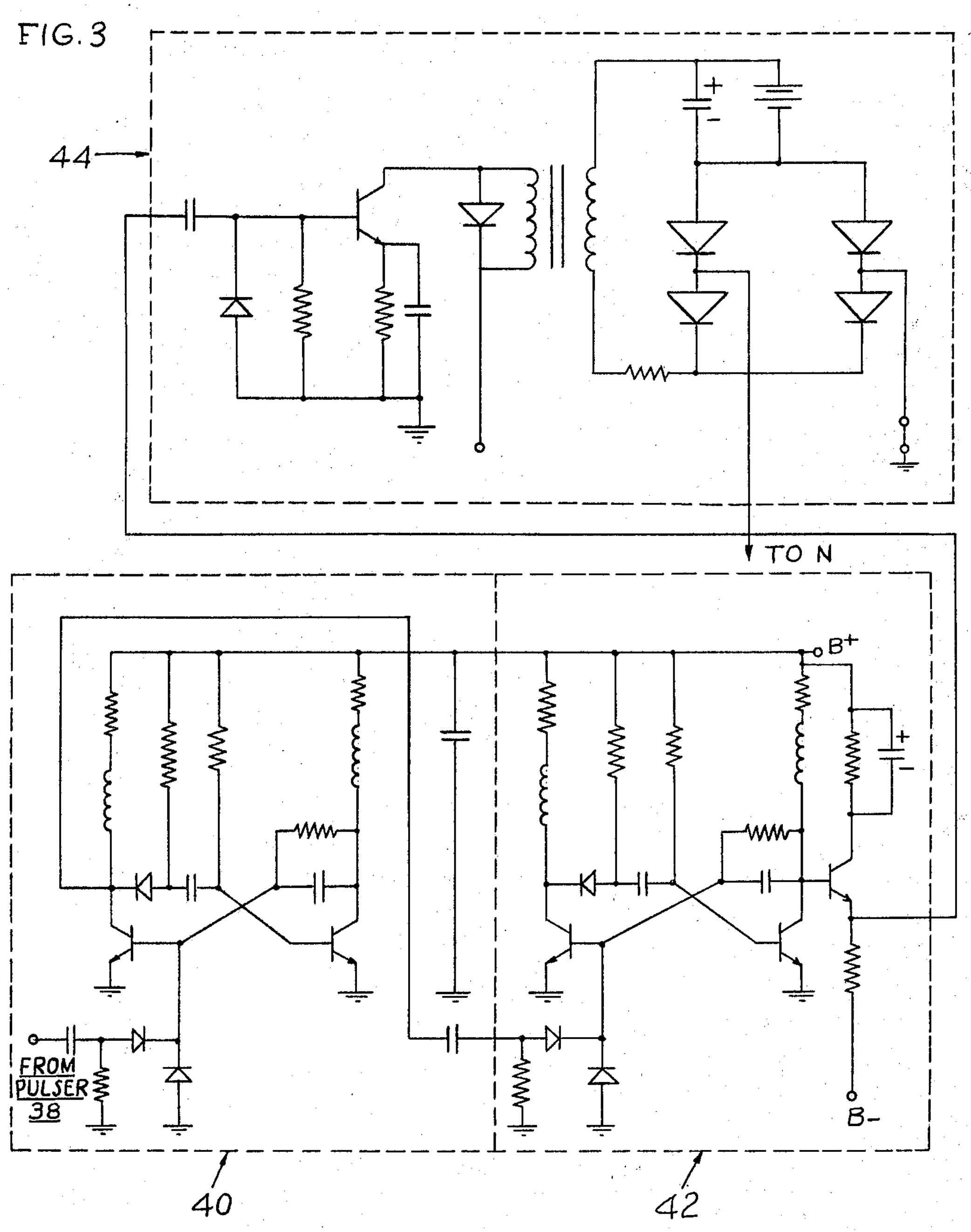
FIGURE 3 is a schematic showing of a portion of the actual circuitry of the preferred embodiment of FIGURE 1.

Delay devices 40 and 42 and switch 44 are shown schematically in FIGURE 3. The delay devices preferably comprise monostable multivibrators of a type well known in the art. Upon receipt of an input pulse, the first of these series connected multivibrators (delay device 40) will switch its conductive state and will provide an output pulse of 10 microseconds duration. At the end of this period, which is determined by the passive circuit components, the first multivibrator will return to its stable state. When the first multivibrator returns to its initial state, a gating pulse will be generated and applied to the second multivibrator (delay device 42). This gating pulse will cause the second multivibrator to switch and provide an output pulse of 5 microseconds duration. This 5 microsecond pulse is amplified and applied as the input to switch 54. Switch 54 comprises a diode bridge circuit which, when gated on, connects node point N to ground or some other reference potential thus discharging the beam injected charge from the work.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. Apparatus for monitoring the value of a thin film electronic circuit component which is being trimmed to value in step-wise fashion by means of a pulsed high energy beam comprising:

means responsive to the pulsing of the beam for generating a gating signal during the intervals between successive impingements of the beam on the components being trimmed;

normally open switch means operatively connected to said gating signal generating means, said switch means being closed for a predetermined period in response to the generation of a gating signal;

means connecting a first terminal of said switch means to at least a first point on the component being trimmed;

means connecting a second terminal of said switch means to ground potential, closing of said switch means in response to the generation of a gating signal discharging the component being trimmed to the ground potential; and means for comparing the value of the component being trimmed with that of a standard component of like type and for providing a signal indicative of equivalency therebetween, said comparing means being connected to the component being trimmed and sensing the value thereof in the interval between the reopening of said switch means and the next succeeding impingement of the beam on the component.

2. The apparatus of claim 1 wherein the means for generating a gating signal comprises:

delay means responsive to the pulsing of the beam for generating a gating pulse a predetermined period after the beam impinges on the component, said period being longer than the pulse width of the beam control pulses.

3. The apparatus of claim 2 wherein said switch means comprises:

a diode bridge.

4. The apparatus of claim 2 wherein said delay means comprises:

first multivibrator means responsive to the pulsing of the beam for generating an output pulse having a pulse width greater than the width of the beam control pulses;

second multivibrator means responsive to the termination of an output pulse generated by said first multivibrator means for generating a gating pulse having a predetermined width; and means to apply said gating pulses to said switch means.

5. The apparatus of claim 4 wherein said comparing means comprises:

a bridge circuit, the component being trimmed being connected as a first leg of said bridge circuit and a standard component being connected as a second leg of said bridge; and differential amplifier means connected to said bridge circuit for sensing bridge unbalance.

6. The apparatus of claim 5 wherein said first terminal of said switch means is connected to the node point of said bridge circuit and said second terminal of said switch means is grounded.

7. The apparatus of claim 6 further comprising:

means responsive to the balancing of said bridge circuit for disabling the beam generator.

References Cited

UNITED STATES PATENTS

| | | | |
|---|---|---|---|
| 2,500,605 | 3/1950 | De Lang et al. | 338—195 X |
| 2,710,325 | 6/1955 | Johnson | 338—300 X |
| 3,140,379 | 7/1964 | Schleich et al. | |
| 3,293,587 | 12/1966 | Robinson. | |
| 3,315,157 | 4/1967 | Watanabe et al. | |

JOSEPH V. TRUHE, Primary Examiner

W. DEXTER BROOKS, Assistant Examiner

U.S. Cl. X.R.

29—620